United States Patent [19]

Latimer

[11] 4,200,999

[45] May 6, 1980

[54] PIVOTABLE MEANS FOR DECREASING DRAG EFFECTS ON A GENERALLY CYLINDRICAL DREDGE PIPE

[75] Inventor: John P. Latimer, Newport News, Va.

[73] Assignee: Deepsea Ventures, Inc., Gloucester Point, Va.

[21] Appl. No.: 910,424

[22] Filed: May 30, 1978

[51] Int. Cl.² .............................................. E02F 3/90
[52] U.S. Cl. ............................................ 37/54; 37/72; 37/DIG. 8; 114/243; 138/178
[58] Field of Search ................. 37/54, 58, DIG. 8, 72, 37/57; 138/103, 106, 107, 172, 178; 166/367; 405/211; 114/243

[56] References Cited

U.S. PATENT DOCUMENTS

| | | | |
|---|---|---|---|
| 2,859,836 | 11/1958 | Wiener | 114/243 X |
| 3,224,406 | 12/1965 | Clark | 114/243 |
| 3,241,513 | 3/1966 | Rather et al. | 114/243 |
| 3,310,894 | 3/1967 | Ball | 37/57 X |
| 3,456,371 | 7/1969 | Graham et al. | 37/DIG. 8 |
| 3,899,991 | 8/1975 | Chatten et al. | 114/243 |
| 4,075,967 | 2/1978 | Silvey | 114/243 |

Primary Examiner—Clifford D. Crowder
Attorney, Agent, or Firm—Barry G. Magidoff

[57] ABSTRACT

This invention provides a substantially flat plate hingedly connected to a substantially cylindrical pipe intended to be moved through the water in a generally longitudinal alignment, the plate extending behind the pipe during movement through the water. The hinged plate can be formed in modular sections, one or more plate sections being hingedly connected to a pipe section. Individual pipe sections are intended to be joined together to form a single longitudinally extending pipe, for example, for use as a dredge pipe in deep ocean dredging. The hinged plate can be directly connected to the main dredge pipe or the hinged plate can be connected to a substantially smaller diameter pipe which is in turn connected to the main pipe. The plate is preferably not less than two inches away from the outer surface of the main pipe. The plate is especially effective for the movement of substantially vertical pipe through water at speeds of up to about two knots.

16 Claims, 8 Drawing Figures

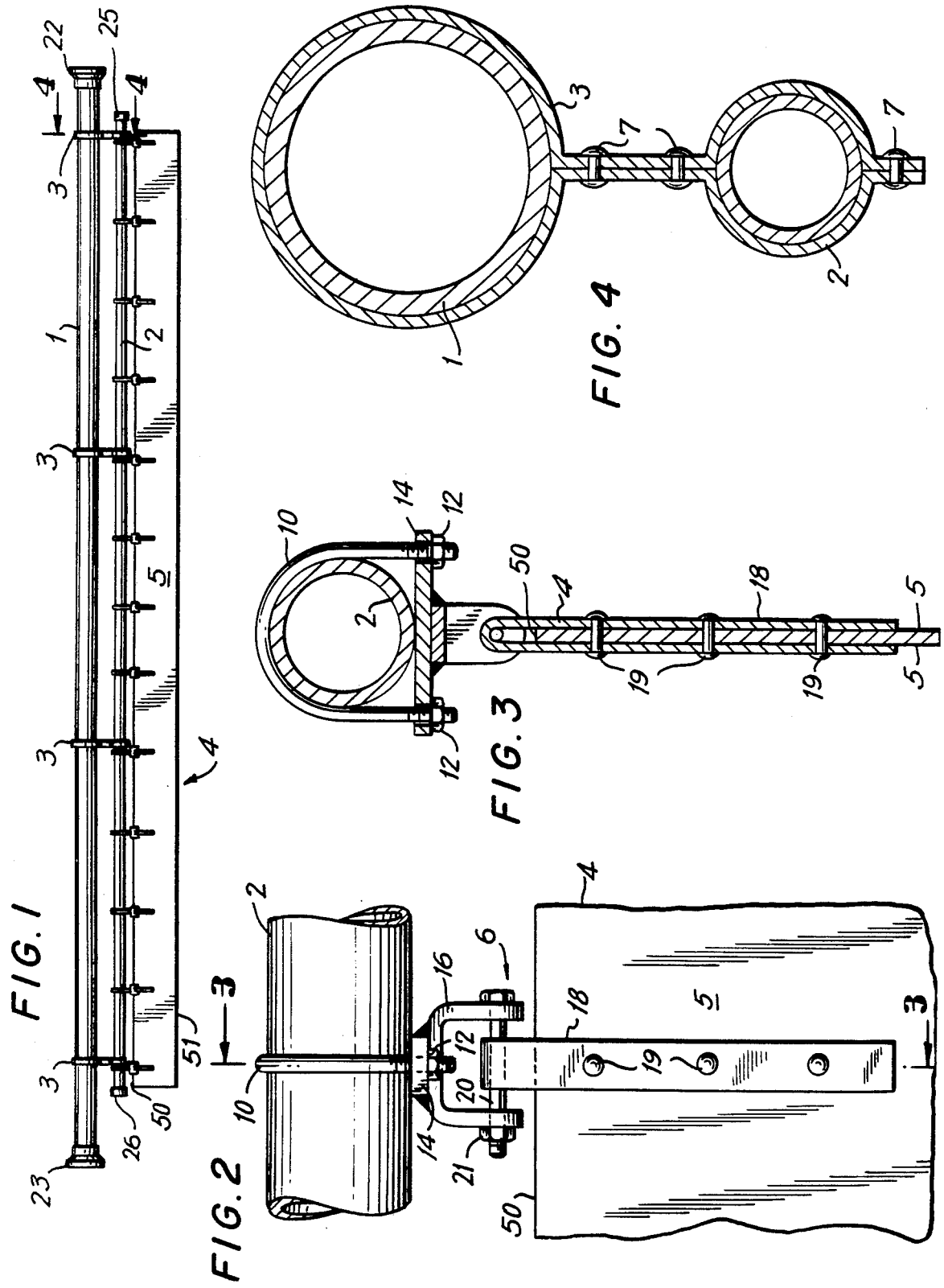

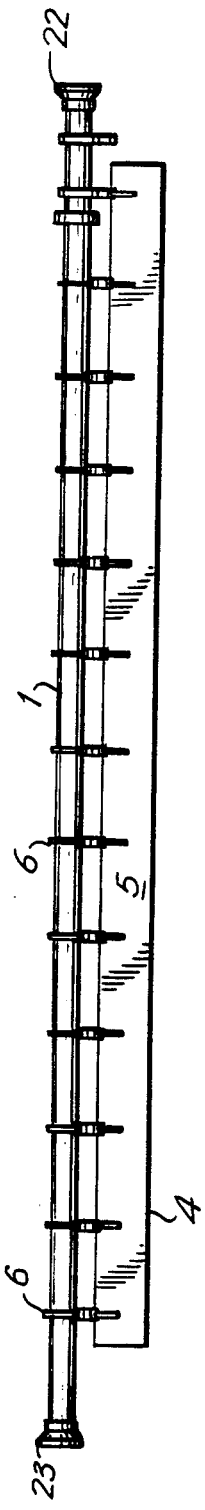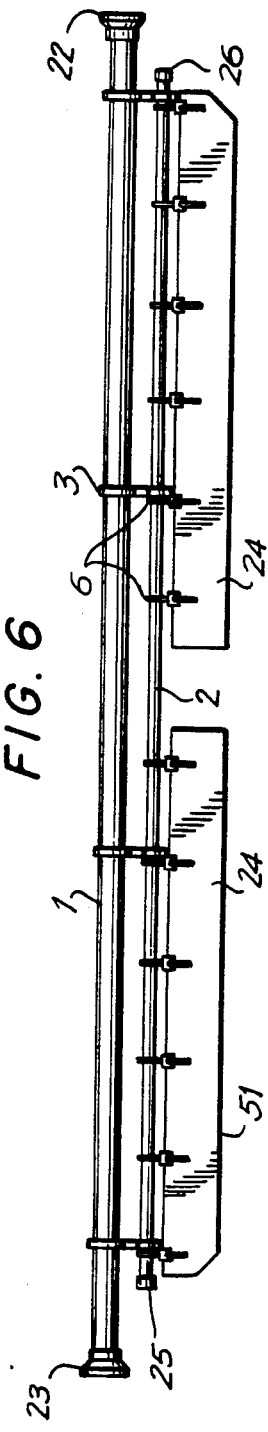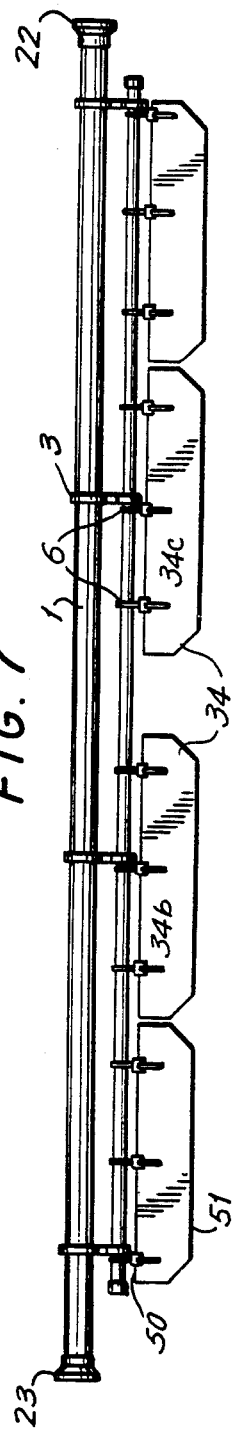

PIVOTABLE MEANS FOR DECREASING DRAG EFFECTS ON A GENERALLY CYLINDRICAL DREDGE PIPE

This invention relates to means for decreasing the effects of drag on a substantially longitudinally aligned, substantially cylindrical member during lateral movement through the water. The drag decreasing means is especially useful during dredging from the deep ocean floor, for example during the recovery of ocean floor nodule ores by a moving surface vessel.

The mining of ocean floor nodule ores is swiftly moving towards commercial reality. The desirability of obtaining these relatively high quality metal ores, at depths often as great as 12,000 to 20,000 feet below the surface, has resulted in a significant increase in interest in extremely deep water dredging and exploration, in order to find new locations for and to obtain the removal of ocean floor nodule ore, or manganese nodules.

One of the systems for obtaining such ores, for example manganese nodule ores, from the ocean floor is the passage of a dredge head unit, operated from a surface vessel, over the ocean floor and the transportation of the dredged ores from the dredging device to the surface, for example through a pipe passing from the dredging device to the surface vessel. Two such dredging and pipe transportation systems are shown for example in U.S. Pat. No. 3,522,670 and in U.S. Pat. No. 3,456,471. The generally fist-sized nodule ores are carried to the surface through the pipe along with sea water. The pumping action can be provided by a variety of mechanical means, or by an airlift system, which provides for the injection of compressed air, at an intermediate position along the pipe length, to create the necessary pressure drop for bringing sea water and solid particles from the ocean floor to the surface. Generally, the same dredge pipeline for carrying the material from the ocean floor to the surface can also be utilized for towing a non-self-propelled vehicle along the ocean floor, or for steering a self-propelled vehicle. In any case, the dredge pipeline extends from a moving surface vessel, in most cases, downwardly to the ocean floor, in a substantially vertical alignment. In most cases, when the surface vessel is moving forwardly, the dredge pipe will extend at a slightly rearward angle, and with a slight catenary.

The movement of the pipe through the water, whether or not the pipe is used to tow the dredge vehicle along the ocean floor, results in a significant amount of flow turbulence, which becomes extremely difficult to control as the depth of the dredge vehicle increases. This is especially true when towing a pipe across an ocean current. When operating at the usual depths for the mining of nodule ores, for example, approximately 12,000 to 20,000 feet beneath the surface, the turbulence, even at relatively low towing speeds, is substantial.

Such turbulence, throughout its length, causes the pipe to transversely vibrate at amplitudes that may cause metal fatigue of the pipe, may damage instrumentation and other attachments to the pipe, and may result in an increase in drag and towing resistance. The frequency of such deleterious vibrations will normally be at or near one of the several natural frequencies of the pipe structure in bending.

The prior art recognized that such undesirable drag and vibration exciting forces could be substantially reduced by the application of a streamlined fairing about the dredge pipe. This, however, resulted in a significant added expense and complication in the pipe handling equipment; the large diameter of the pipe, often between eight inches and sixteen inches in diameter resulted in an extremely bulky fairing which is awkward to handle during assembly of the long pipe.

In the somewhat related art of marine towlines or cables, the use of fairings has long been considered conventional in order to avoid the same type of undesirable drag stress effect. Such previously utilized fairings, include that shown, for example, in U.S. Pat. No. 3,443,020, assigned to UniRoyal, Inc., and U.S. Pat. No. 3,461,830, assigned to Shell Oil Company. The latter patent describes a fairing for a marine towline, which is free to rotate about the cable.

Rigid plates have been utilized to decrease turbulence from pipes in the cross-flow of gases.

It has now been discovered that the adverse efects of drag can be substantially, if not completely, reduced without the necessity of a bulky fairing completely surrounding the dredging pipe.

In accordance with the present invention, the undesirable effects of drag can be significantly reduced on a dredge pipe being towed through the water and extending in a substantially longitudinal direction in the water, transverse to the direction of movement; the pipe is provided with a substantially flat plate, extending outwardly from the pipe and pivotally connected to the pipe along an axis substantially parallel to the axis of the pipe, the plate being relatively thin in cross-section.

In a most preferred embodiment, the dredge pipe is provided in modular segments, each segment being capable of being joined at each end to adjoining and substantially similar modular segments. The flat plate, or splitter plate, is connected as a single plate, or alternatively multiple plates, to each pipe segment. The axis of rotation of the splitter plate is preferably at least about three inches from the outer surface of the main dredge pipe, and can be attached either to the main dredge pipe or, where a subsidiary, smaller airpipe is present, to the smaller pipe.

A more clear understanding of the present invention and its advantages can be obtained from the following verbal description in conjunction with the accompanying drawings, depicting several specific embodiments of this invention. In the drawings:

FIG. 1 is a side view of one preferred embodiment of a pipe section in accordance with the present invention.

FIG. 2 is an enlarged side view of a portion of FIG. 1, with the remaining portions broken away.

FIG. 3 is a sectional view taken along lines 3—3 of FIG. 2.

FIG. 4 is a sectional view taken along lines 4—4 of FIG. 1.

FIG. 5 is a side view of a second preferred embodiment of the present invention.

FIG. 6 is a side view of a third embodiment of the present invention.

FIG. 7 is a side view of yet another preferred embodiment of the present invention.

FIG. 8 is a diagrammatic sketch showing a surface ship towing a dredge means and dredge pipeline.

As illustrated in FIGS. 1 through 4, a preferred embodiment of the present invention comprises a dredge pipe section 1 having joining means 22, 23 at each end thereof. The dredge pipe section 1 is a single module and is intended to be connected with other like sections to eventually form a dredge pipe string up to 20,000 feet long, each section having the joining ends 22, 23 for connection to the next adjoining length of pipe. Generally, each length of pipe can be, for example, approximately 36 feet long and from about 6 inches to about 18 inches in diameter.

A subsidiary air pipe section 2 is rigidly attached by the rigid connecting straps 3 firmly clamped about the circumferences of both the dredge pipe 1 and air pipe 2 at four locations along their respective lengths. The connecting straps are clamped together in place by the rivets 7.

As shown in FIGS. 1 and 4, the dredge pipe section and air pipe section are rigidly held in substantially parallel alignment, the outer circumference of each pipe being separated from the other pipe's surface. Preferably, the distance of separation is at least equal to the diameter of the air pipe 2, and most preferably is at least about 3 inches. The air pipe 2 is, in the configuration shown, slightly shorter along its longitudinal axis than the dredge pipe. However, when the pipe sections are assembled to form the pipe string reaching to the ocean floor, a substantially continuous length of pipe is present for both the dredge pipe and the air pipe. The differences in length are accounted for by slightly different procedures for coupling the pipe sections together for both the air pipe and the dredge pipe. Such coupling procedures, however, do not form any part of this invention, and therefore are not specifically described herein. Substantially, any means for forming the continuous lengths of pipe shown in FIG. 8 can be utilized.

In the embodiment of FIGS. 1 through 4, a splitter plate 4 extending substantially the entire length of the air pipe section 2 is pivotally connected to the air pipe by a plurality of hinged connectors, generally designated by the numeral 6. The hinged connectors comprise a U-shaped shackle 10 threaded at each end and clamping the air pipe section 2 against a shackle plate 14. The threaded shackle 10 is held on to the plate 14 by the nuts 12 threaded onto its ends.

A hinge support 16 is rigidly connected, as by welding, onto the shackle plate 14 and supports a hinge pin 20, extending substantially parallel to the axis of the pipe sections and held on the support 16 by the rigidly connected head at one end and threaded nut 21, at the threaded end. A hinge strap 18 is pivotally held upon the pin 20 and rigidly attached along its sides to the splitter plate 4 by three rivets 19. As shown in FIG. 1, there are 13 hinged connectors 6 connecting the splitter plate 4 onto the hinge pin 20.

As shown in the drawings, the splitter plate 4 is a thin substantially flat plate, whose longitudinal surfaces 5 extend in a direction substantially parallel to the axis of the pipe section and are substantially parallel. Preferably, the thickness of the splitter plate 4, i.e., in a direction along the longitudinal axes of the rivets 19, is at least about an order of magnitude less than the other two dimensions of the plate 4 and of the external diameter of the dredge pipe 1.

Although, if desired, the splitter plate can be pivoted about an axis substantially immediately adjacent the outer surface of the dredge pipe, it is preferred that the inner edge 50 of the splitter plate 4 be separated from the outer surface of the pipe 1 by at least about 2 inches, and even more preferably by at least about one-third the diameter of the pipe 1. As shown in FIGS. 1 through 4, the splitter plate is hinged about the subsidiary air pipe 2, and therefore the hinge axis 20 of the splitter plate 4 is separated from the pipe surface 1 by a distance (y) most preferably equal to at least one-half the diameter of the dredge pipe 1 and optimally not greater than the diameter of the dredge pipe 1.

The distance separating the plate 4 from the subsidiary air pipe 2 is not as significant, as long as the subsidiary air pipe 2 has an external diameter not greater than about one-half the external diameter of the dredge pipe 1. However, optimally, the inner edge 50 of the plate 4 is also separated from the air pipe by a distance of at least about 1 inch.

The width of the splitter plate 4, i.e. the distance between the inner edge 50 and outer edge 51 is preferably equal to or greater than about the distance from the forward edge of the pipe 1 to the hinge axis of the splitter plate, i.e., the pipe diameter plus the separation y.

The splitter plate 4 pivots about an axis that is preferably separated from the outer surface of the dredge pipe 1 by a distance of at least about one inch and most preferably by a distance at least equal to about one-half of the diameter of the dredge pipe. The maximum separation is determined by the desired effect; however, preferably the axis is separated from the dredge pipe 1 by a distance of not more than about four times the dredge pipe diameter, most peferably not more than two times the dredge pipe diameter, but optimally not substantially more than the diameter of the dredge pipe.

The inner edge of the plate can be substantially at the axis of rotation of the plate, but need not be. Thus, the preferred maximum distance between the inner plate edge 50 and the outer surface of the pipe 1 is about five times the diameter of the main pipe and most preferably not more than about 1.5 times the diameter of the main pipe 1.

It is also preferred that the external diameter of the air pipe 2 be substantially not greater than $\frac{1}{2}$ the external diameter of the dredge pipe 1. The total length of the splitter plate 4 in FIG. 1, should be at least a major portion of the total length of the dredge pipe 1. Preferably, the splitter plate extends along a distance at least equal to about 80% of the length of the dredge pipe 1 and most preferably about 90% of the length of dredge pipe 1. As shown, therefore, there will be gaps between the upper and lower edges, respectively, of the splitter plates attached to adjoining dredge pipe sections 1. Most preferably the splitter plates 4 are substantially centered along the length of each section of pipe 1 along the length of the dredge pipe string.

FIGS. 6 and 7 show alternative embodiments of the splitter plate, where the splitter plate is divided into two sections 24 along each section of dredge pipe 1, as shown in FIG. 6, and into four sections, attached to each section of dredge pipe 1, as shown in FIG. 7. The corners of each of splitter plates 34 in FIG. 7 can be chamfered so as to form angles in the range from about 30 to about 60 degrees, and most preferably approximately 45 degrees in order to facilitate their passage through structural openings. In FIG. 6, only the outer corners, respectively, of each of the upper and lower splitter plates 24 are chamfered. In yet another embodiment, not shown, where there are four splitter plates as shown in FIG. 7, the two middle splitter plates, i.e. 34b and 34c, do not have their corners chamfered.

As shown in FIG. 5, the splitter plate can be also hingedly connected directly to the dredge pipe section 1. As explained above, the air pipe need only be connected to the dredge pipe along the upper portion of the dredge pipe string, in order to obtain the desired air lift effect from the ocean floor. Accordingly, at the portions of the dredge pipe string below the level of the air pipe, the splitter plate 4 is hingedly connected directly to the dredge pipe 1. Approximately the same dimensions should be used as set forth above with regard to the relative thickness, width, and length of the splitter plate 4 relative to the dredge pipe section 1, and further with respect to the separation between the inner surface 50 of the splitter plate 4 and the outer surface of the dredge pipe 1.

In FIG. 5, the hinged connectors 6, connecting the splitter plate 4 to the dredge pipe section 1, are substantially of the same construction as is shown in FIGS. 2 and 3, except, of course, that the dimensions of the U-shaped shackle 10 and of the shackle plate 14, as well as the length of the hinge support members 16 are greater in order to fit the greater diameter of the dredge pipe and to obtain the desired separation of the splitter plate from the pipe surface, respectively, as explained above.

Splitter plate length is short, preferably less than about 5%, relative to the expected pipe vibration nodal spacing. Operationally, axial lengths of about 5 to about 10 times the plate width, provide satisfactory effect.

In testing an embodiment of the present invention, a dredge pipe string is formed totalling approximately 15,000 feet in length and extending from a moving surface vessel to the floor of the ocean. The air pipe 2 extends only a portion of the way down from the surface, such that the upper portion of the dredge pipe string is formed of a plurality of sections in accordance, e.g., with FIG. 1 of the attached drawings and the lower portion of the dredge pipe string is formed of a plurality of interconnected sections in accordance with FIG. 5 of the attached drawings. Taking an example of a single length of pipe along that string, the external diameter of the dredge pipe is approximately 7 inches, the diameter of the air pipe is approximately $2\frac{1}{4}$ inches, the width of the splitter plate is approximately 18 inches and the thickness of the splitter plate is approximately one-half-inch, and the distance between the inner edge 50 of the splitter plate and the outer surface of the dredge pipe is approximately 10 inches. The axis of rotation of the splitter plate, e.g. the longitudinal axis of the hinge pin 20, in FIG. 2, is approximately 9 inches from the outer surface of the dredge pipe 1.

The hinged splitter plate in accordance with the present invention, in whichever configuration it is utilized, has been found to provide a significant reduction in the strain on the dredge pipe caused by drag and vibration during movement through the ocean.

Lightweight materials of construction for the splitter plates are preferred. Examples of such materials include ABS plastic or fiberglass-reinforced synthetic polymers such as polyester or epoxy resins.

It is further found that the splitter plate is most effective at relatively low speeds through water, generally at speeds of not greater than about 2 knots. The formation of eddy currents behind the generally cylindrical pipe was substantially reduced and therefore the resultant side forces which had previously been found to create transversely directed vibrations in a towed pipe were also reduced, by the splitter plates extending behind the pipe.

The drawing of FIG. 8 illustrates the dredge pipe string connecting the towing vessel 60 to the towed dredge vehicle 62. As shown, the air pipe extends only part of the way down to the dredge vehicle, such that along the upper portion the splitter plates are hinged from the air pipe as in FIG. 6, for example, whereas at the lower portions the splitter plates are hinged directly from the dredge pipe, as in FIG. 5, for example.

The patentable embodiments of this invention which we claimed are as follows:

1. In a length of pipe having a longitudinal axis and intended to be moved through the water in a direction transverse to the longitudinal axis, the improvement comprising a flat relatively thin plate pivotally connected to the length of pipe, the plate pivoting about an axis located radially outwardly of the pipe circumference and substantially parallel to the longitudinal axis of the pipe and the plate extending along at least a major portion of the length of the pipe, whereby the drag and vibration stress exerted on the pipe during such transverse motions through water is substantially reduced.

2. The pipe of claim 1, wherein the thickness of the flat plate is substantially at least an order of magnitude smaller than any other dimension of the plate.

3. The pipe of claim 2, wherein the inner edge of the plate is at least about 3 inches from the outer surface of the pipe.

4. The pipe of claim 2, wherein the pivot axis of the plate is separated from the outer surface of the pipe by a distance of at least about one-half the diameter of the pipe.

5. The pipe of claim 4, wherein the pivot axis of the plate is separated from the outer surface of the pipe by a distance not greater than about the diameter of the pipe.

6. The pipe of claim 5, wherein the length of the plate is not more than about 10 times the width of the plate.

7. The pipe of claim 6, wherein the pivoting plate comprises at least two independently movable sections, each section pivoting about an axis parallel to the longitudinal axis of the pipe.

8. The pipe of claim 2, comprising in addition joining means located at each end of the pipe and designed and adapted to connect the pipe to adjoining sections of pipe, whereby a continuous enclosed conduit can be provided.

9. The pipe of claim 2, wherein the width of the plate is equal to at least about the diameter of the pipe.

10. The pipe of claim 2, comprising in addition a subsidiary pipe substantially rigidly connected to the pipe and extending along a longitudinal axis substantially parallel to the axis of the pipe, the subsidiary pipe having an external diameter not greater than about one-half the external diameter of the pipe and wherein the substantially flat plate is pivotally connected to the subsidiary pipe.

11. The combined pipes of claim 10, wherein the longitudinal axes of the pipe and the subsidiary pipe and the axis of rotation of the plate all lie in substantially a single plane.

12. The combined pipes of claim 11, wherein the diameter of the pipe is at least about 6 inches and wherein the thickness of the plate is at least about $\frac{1}{4}$-inch.

13. The pipe of claim 2, wherein the distance between the pivot axis of the plate and the outer surface of the pipe is not more than about 1.5 times the diameter of the pipe.

14. The pipe of claim 2, wherein the ratio between the width of the plate and the outer diameter of the pipe is in the range of from about 1:1 to about 1:3.

15. Means for underwater mining comprising a movable surface vessel, a conduit extending from the surface vessel substantially to the floor of the ocean and bottom dredging means, the conduit comprising a plurality of pipe sections, each section being joined at each end to an adjacent section so as to form a substantially continuous conduit, a splitter plate pivotally connected to each of said pipe sections about an axis, located radially outwardly of the pipe circumference and substantially parallel to the longitudinal axis of the pipe section, whereby the effect of drag forces upon the conduit when the conduit moves through the water in a direction substantially transverse to the length of the pipe is substantially reduced.

16. The apparatus of claim 15, comprising in addition an air pipe conduit substantially rigidly connected along the upper portion of the pipe and wherein the splitter plate is pivotally connected directly onto the air pipe.

* * * * *

UNITED STATES PATENT AND TRADEMARK OFFICE
CERTIFICATE OF CORRECTION

PATENT NO. : 4,200,999
DATED : May 6, 1980
INVENTOR(S) : John P. Latimer

It is certified that error appears in the above-identified patent and that said Letters Patent are hereby corrected as shown below:

Column 2, lines 63 and 64, delete "Fig. 8...pipeline."

Column 5, line 65, delete "The drawing...illustrates the", and substitute --For example, a--;

line 66, change "connecting" to --connects-- and delete "60";

line 67, delete "vehicle 62. As shown, the" and substitute -- vehicle. An--

Signed and Sealed this

Fourth Day of November 1980

[SEAL]

Attest:

SIDNEY A. DIAMOND

Attesting Officer

Commissioner of Patents and Trademarks